(12) United States Patent
Ostergren et al.

(10) Patent No.: US 8,979,647 B2
(45) Date of Patent: Mar. 17, 2015

(54) METHOD OF PROVIDING PLAYER STATUS AND ABILITY TO JOIN GAMES

(75) Inventors: Brian Ostergren, Redmond, WA (US); Trisha Eileen Stouffer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 694 days.

(21) Appl. No.: 11/925,057

(22) Filed: Oct. 26, 2007

(65) Prior Publication Data

US 2009/0111576 A1   Apr. 30, 2009

(51) Int. Cl.
A63F 13/795 (2014.01)
A63F 13/30 (2014.01)

(52) U.S. Cl.
CPC ........... *A63F 13/12* (2013.01); *A63F 2300/308* (2013.01); *A63F 2300/552* (2013.01); *A63F 2300/556* (2013.01); *A63F 2300/636* (2013.01); *A63F 2300/5566* (2013.01)
USPC .......................................................... 463/29

(58) Field of Classification Search
CPC .................. A63F 13/79; A63F 13/795; A63F 2300/5546; A63F 2300/556
USPC ................................................. 463/29, 42, 1
See application file for complete search history.

(56) References Cited

U.S. PATENT DOCUMENTS

| | | |
|---|---|---|
| 5,222,236 A | 6/1993 | Potash et al. |
| 5,846,132 A | 12/1998 | Junkin |
| 6,224,485 B1 | 5/2001 | Dickinson et al. |
| 6,699,125 B2 | 3/2004 | Kirmse et al. |
| 6,852,033 B2 | 2/2005 | Kinjo et al. |
| 6,881,148 B2 | 4/2005 | Yotsugi et al. |
| 7,056,217 B1 | 6/2006 | Pelkey et al. |
| 7,090,577 B2 | 8/2006 | Serizawa et al. |
| 7,240,093 B1 | 7/2007 | Danieli et al. |
| 7,311,608 B1 * | 12/2007 | Danieli et al. .................. 463/42 |
| 7,441,151 B2 | 10/2008 | Whitten et al. |
| 2002/0086732 A1* | 7/2002 | Kirmse et al. .................. 463/42 |
| 2002/0160838 A1 | 10/2002 | Kim |

(Continued)

FOREIGN PATENT DOCUMENTS

| | | |
|---|---|---|
| EP | 1052588 A3 | 5/2002 |
| JP | 2002066143 A | 3/2002 |

(Continued)

OTHER PUBLICATIONS

"International Search Report", Mailed Date: Jul. 15, 2009, Application No. PCT/US2008/080597, Filed Date: Oct. 21, 2008, pp. 10.

(Continued)

*Primary Examiner* — Omkar Deodhar
*Assistant Examiner* — Allen Chan
(74) *Attorney, Agent, or Firm* — Heikki Einola; Judy Yee; Micky Minhas

(57) ABSTRACT

A method is disclosed in a gaming and media system for quickly and efficiently showing all friends gaming at a given time, what they are playing, and for providing the ability to download and/or join their friend's game. Information relating to which friends are gaming online, what games they are playing and whether their games are joinable are consolidated onto a single GUI. That same GUI, referred to as a Friends Playing Now GUI, also provides the user with the ability to join games which are indicated to be joinable.

20 Claims, 6 Drawing Sheets

(56) References Cited

U.S. PATENT DOCUMENTS

| | | | |
|---|---|---|---|
| 2003/0204566 A1 | 10/2003 | Dhupelia et al. | |
| 2003/0233537 A1 | 12/2003 | Wohlgemuth et al. | |
| 2004/0152517 A1* | 8/2004 | Hardisty et al. | 463/42 |
| 2004/0162144 A1 | 8/2004 | Loose et al. | |
| 2004/0192440 A1 | 9/2004 | Evans et al. | |
| 2004/0220850 A1 | 11/2004 | Ferrer et al. | |
| 2005/0004840 A1 | 1/2005 | Wanninger | |
| 2005/0070359 A1 | 3/2005 | Rodriquez et al. | |
| 2005/0091108 A1 | 4/2005 | Frost | |
| 2005/0096982 A1 | 5/2005 | Morton et al. | |
| 2005/0114526 A1 | 5/2005 | Aoyama | |
| 2005/0209002 A1 | 9/2005 | Blythe et al. | |
| 2005/0239550 A1 | 10/2005 | Hardisty et al. | |
| 2005/0282628 A1 | 12/2005 | Beatty et al. | |
| 2006/0003841 A1 | 1/2006 | Kobayashi et al. | |
| 2006/0121973 A1 | 6/2006 | Parisien | |
| 2006/0121986 A1* | 6/2006 | Pelkey et al. | 463/40 |
| 2006/0121992 A1 | 6/2006 | Bortnik et al. | |
| 2006/0122716 A1 | 6/2006 | Bortnik et al. | |
| 2006/0199646 A1* | 9/2006 | Kogo | 463/43 |
| 2006/0258460 A1 | 11/2006 | Crawford et al. | |
| 2006/0287099 A1* | 12/2006 | Shaw et al. | 463/42 |
| 2006/0287106 A1* | 12/2006 | Jensen | 463/42 |
| 2007/0005704 A1 | 1/2007 | Heron et al. | |
| 2007/0060317 A1 | 3/2007 | Martin | |
| 2007/0060368 A1 | 3/2007 | Cheng | |
| 2007/0117635 A1 | 5/2007 | Spanton et al. | |
| 2007/0173325 A1* | 7/2007 | Shaw et al. | 463/42 |
| 2007/0191101 A1 | 8/2007 | Coliz et al. | |
| 2008/0039209 A1 | 2/2008 | Chen et al. | |
| 2008/0070359 A1 | 3/2008 | Tsuno | |
| 2009/0082101 A1 | 3/2009 | Ostergren et al. | |
| 2009/0111581 A1 | 4/2009 | Ostergren et al. | |
| 2009/0239666 A1 | 9/2009 | Hall et al. | |
| 2011/0312398 A1 | 12/2011 | Ziegler et al. | |
| 2012/0011189 A1 | 1/2012 | Werner et al. | |

FOREIGN PATENT DOCUMENTS

| | | |
|---|---|---|
| JP | 2002239212 A | 8/2002 |
| JP | 2002336552 A | 11/2002 |
| JP | 2002360936 A | 12/2002 |
| JP | 2003164671 A | 6/2003 |
| JP | 2005103265 A | 4/2005 |
| KR | 10-1999-0072023 A | 9/1999 |
| WO | 0101307 A2 | 1/2001 |
| WO | 2007/097850 A2 | 8/2007 |

OTHER PUBLICATIONS

Monsarrat, "Adapting Massively Multiplayer Internet Computer Games to the Mainstream Market: A Business Plan for Turbine Entertainment Software," May-Jun. 2000 http://dspace.mit.edu/bitstream/1721.1/32707/1/49340604.pdf.
Christoph et al., "PunkBuster for Players," May 18, 2004 http://www.evenbalance.com/publications/aa-pl/.
Inklink, Atom Entertainment, Inc., 2007, <retrieved from Internet Jul. 4, 2007> http://www.shockwave.com/gamelanding/inklink.jsp.
Subramani et al., Knowledge-Sharing and Influence in Online Social Networks via Viral Marketing, Communications of the ACM, Dec. 2003/vol. 46, No. 12ve, pp. 300-307, http://delivery.acm.org/10.1145/960000/953514/p300-subramani.pdf?key1=953514&key2=6249543811&coll=GUIDE&dl=GUIDE&CFID=17286036&C FTOKEN=40030580.
Microsoft Corporation, Xbox 360, Complete Dashboard Update Feature List, Nov. 2006 http://en.wikipedia.org/wiki/Xbox_Live_Arcade.
Achievements: Your Gaming Legacy, Microsoft Corporation, 2007, <retrieved from Internet Jul. 5, 2007> http://www.xbox.com/en-US/games/tips/achievements.htm.
Dashboard Enhancements, Design and Content, XBox 360 Spring 2007 Update Review, 2005-2007 Ronald Heft, Jr., May 9, 2007 http://cavemonkey50.com/2007/05/xbox-360-update-review/.
U.S. Appl. No. 13/608,407, filed Sep. 10, 2012.
Response to Final Office Action filed Apr. 24, 2012, U.S. Appl. No. 11/859,194.
Response to Office Action filed Nov. 14, 2011, U.S. Appl. No. 11/859,194.
Office Action dated Jul. 28, 2011, U.S. Appl. No. 11/926,545.
Response to Office Action filed Aug. 26, 2011, U.S. Appl. No. 11/926,545.
Office Action dated Sep. 8, 2011, U.S. Appl. No. 11/926,545.
Office Action dated Jul. 14, 2011, U.S. Appl. No. 11/859,194.
Response to Office Action filed Jan. 9, 2012 in U.S. Appl. No. 11/926,545.
Notice of Allowance and Fee(s) Due dated Jan. 31, 2012 in U.S. Appl. No. 11/926,545.
Final Office Action mailed Jan. 24, 2012, U.S. Appl. No. 11/859,194.
Office Action dated Dec. 26, 2012 in U.S. Appl. No. 13/608,407.
Office Action dated Aug. 27, 2012 in Israeli Patent Application No. 204268.
Notice of Allowance dated May 10, 2012 in U.S. Appl. No. 11/859,194.
Office Action dated May 3, 2012 in Chinese Patent Application No. 200880113481.X.
Response to Office Action dated Jul. 3, 2012 in Chinese Patent Application No. 200880113481.X.
Office Action dated Jun. 13, 2013 in U.S. Appl. No. 13/608,407.
Response to Office Action filed Jun. 17, 2013 in U.S. Appl. No. 13/608,407.
Notice of Allowance and Fee(s) Due dated Jul. 31, 2013 in U.S. Appl. No. 11/493,646.
Response to Office Action filed Mar. 22, 2013 in U.S. Appl. No. 13/608,407.
Response to Office Action filed Feb. 26, 2013 in Israeli Patent Application No. 204268.
Notice of Allowance and Fee(s) Due dated Sep. 6, 2013 in U.S. Appl. No. 13/608,407.
U.S. Appl. No. 14/148,187, filed Jan. 6, 2014.
"Notice of Allowance Received in Japan Patent Application No. 2010-531161", Mailed Date: Nov. 11, 2013, Filed Date: Oct. 21, 2008, 3 Pages. (w/o English Translation).
"Office Action Issued in Israel Patent Application No. 204268", Mailed Date: Feb. 2, 2014, 7 Pages.
Communication dated Dec. 16, 2013 in European Patent Application No. 08841967.6.
Response to Official Communication filed Mar. 5, 2014 in European Patent Application No. 08841967.6.
Office Action dated May 19, 2014 in U.S. Appl. No. 14/148,187.
Response to Office Action filed Aug. 11, 2014 in Israel Patent Application No. 204268.
Response to Office Action filed Aug. 18, 2014 in U.S. Appl. No. 14/148,187.
Office Action dated Nov. 6, 2014 in U.S. Appl. No. 14/148,187.
Office Action dated Oct. 17, 2014 in Korean Patent Application No. 10-2010-7008644.

* cited by examiner

US 8,979,647 B2

METHOD OF PROVIDING PLAYER STATUS AND ABILITY TO JOIN GAMES

BACKGROUND

Gaming systems have evolved from those which provided an isolated gaming experience to networked systems providing a rich, interactive experience which may be shared in real time between friends and other gamers. With Microsoft's Xbox® video game system and Xbox Live® online game service, users can now easily communicate with each other while playing to share the gaming experience. Moreover, when not playing in tandem, current gaming systems allow friends to track others' gaming experiences and accomplishments.

One way in which users track their and their friends' progress through different games is through the concept of game scores and achievements. As gamers progress through a game and complete game-specific challenges, such as getting to a new level or amassing a specified number of wins against other players, the Xbox Live service keeps track of scores and achievements for Xbox Live service subscribers. Where once a gamer's scores and achievements were only seen by him or her, gamers are now able to see the real time progress of others, either while logged on to the Xbox Live service via an Xbox game console or online. Game progress has become a highly visible measure associated with users, and the keeping and posting of scores and achievement data has evolved into a strong selling point for the Xbox platform and games. Friends and users now compete with each other for the highest scores and most achievements.

Another innovation in current gaming systems is the ability to quickly and easily download games. For example, Microsoft introduced a gaming disc known as Microsoft Arcade which is able to connect to a server through the Internet when the gaming console is connected to the Internet. From the server site, the Arcade gaming disc is able to enumerate full version games which are available for download to the user's hard disc drive on the XBox console. In the past, when a user learned of a game through a friend or otherwise, the user either had to go to a store to purchase the game media, or have the media delivered after an online purchase. With the passage of time and difficulty involved in the purchase, users often lost interest and did not follow through with the purchase. However, platforms such as Microsoft Arcade allow users to obtain games as soon as they learn about them.

Moreover, in some instances, once friends share the same game, a user is able to "join" the game of one of their friends so that they are able to play the game together, in tandem, from their respective remote locations. It has evolved as a recurring tendency that users want to quickly learn what games other people are playing online and join the game if possible. In the past, this has involved multiple steps. The steps included starting a game, entering the multiplayer menu, and searching for a game. Often times there are no multiplayer games available to join, but a user would not know this until they go through the above steps. This can be frustrating and time consuming.

Features such as real time game progress, the ability to join friends' games and the ability to instantly download games have increased interest and sales in gaming platforms. However, there is room for greater synergy between these features.

SUMMARY

Embodiments of the present system relate to a system for quickly and efficiently showing all friends gaming at a given time, what they are playing, and for providing the ability to download and/or join their friend's game. In embodiments of the present system, information relating to which friends are gaming online, what games they are playing and whether their games are joinable are consolidated onto a single GUI. That same GUI, referred to herein as a Friends Playing Now GUI, also provides the user with the ability to join games which are indicated to be joinable.

A user may access the Friends Playing Now GUI from a system menu. Once accessed, embodiments of the Friends Playing Now GUI display all of the user's friends that are then currently gaming online. The GUI displays the friends' names in the form of an avatar and/or a friend's online identity. The GUI also displays the games the friends are playing, and the friends' status within the respective games. The Friends Playing Now GUI further includes an indication of which of the listed games are joinable.

A user may indicate one of the friend's games to launch and/or join. Once an indication is received, the system checks whether the indicated game is local on the user's system. If not, the game is downloaded from a network service. Once downloaded, if the game is not joinable, the game is launched. If the game is joinable, the game is launched and the user joins his or her friend in the game.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
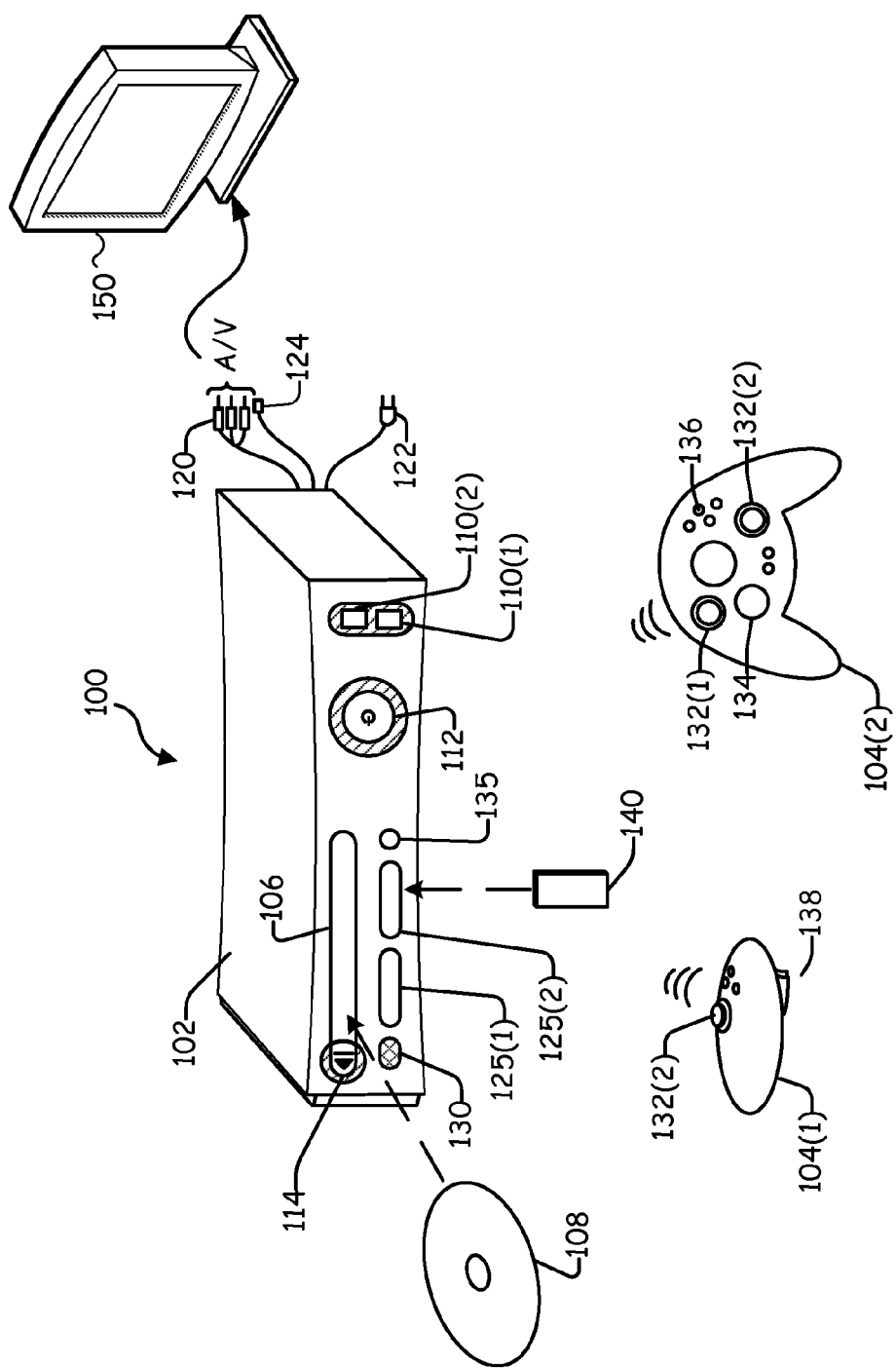
FIG. 1 is an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140. Samples of the types of media that gaming and media system 100 is capable of playing include:

Game titles played from CD and DVD discs, from the hard disk drive, or from an online source.
Digital music played from a CD in portable media drive 106, from a file on the hard disk drive (e.g., music in the Windows Media Audio (WMA) format), or from online streaming sources.
Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to select a game using controller 104 and display achievement information as discussed below.

Figure 2:
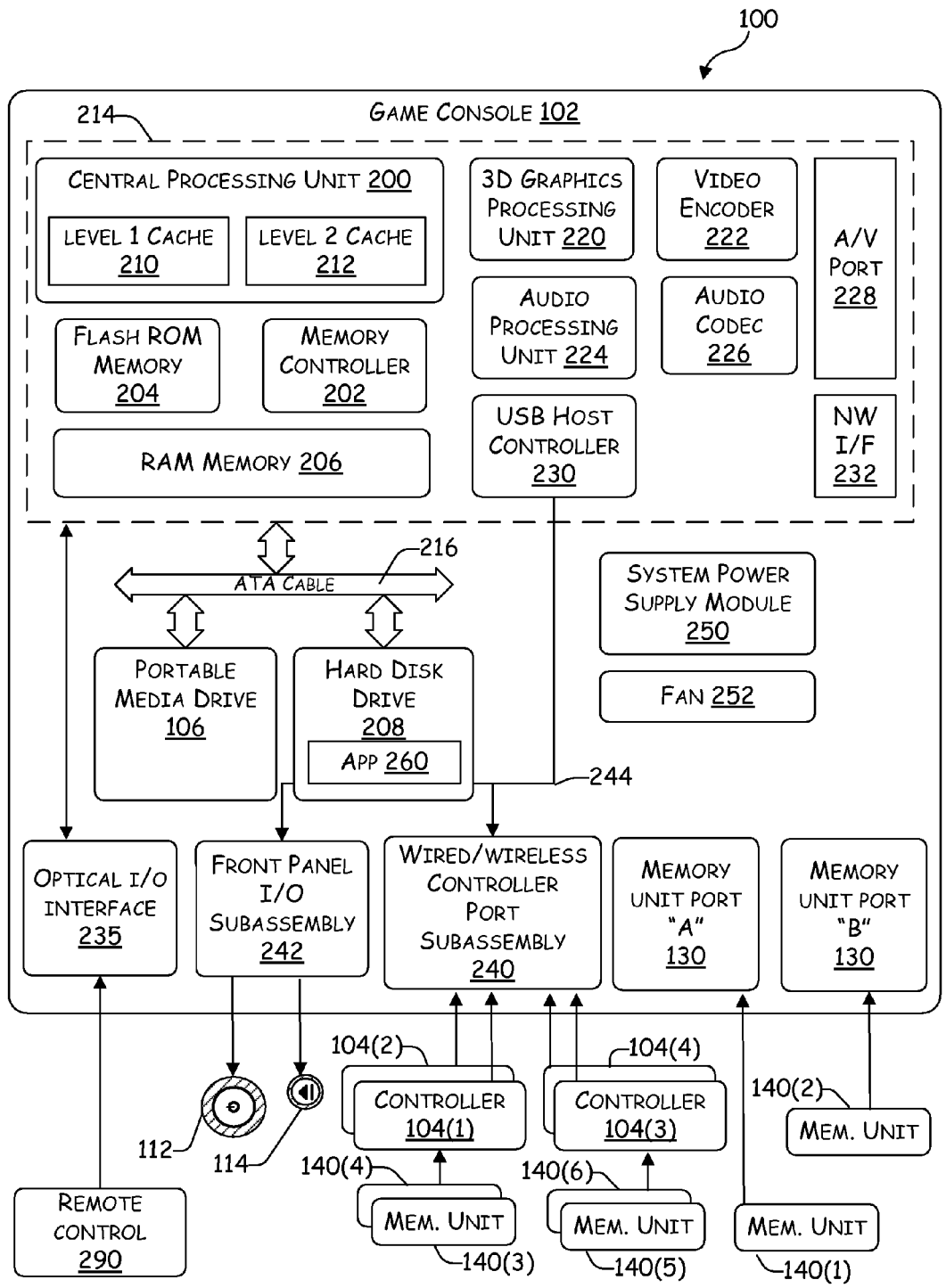
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed below in connection with FIG. 3.

Figure 3:
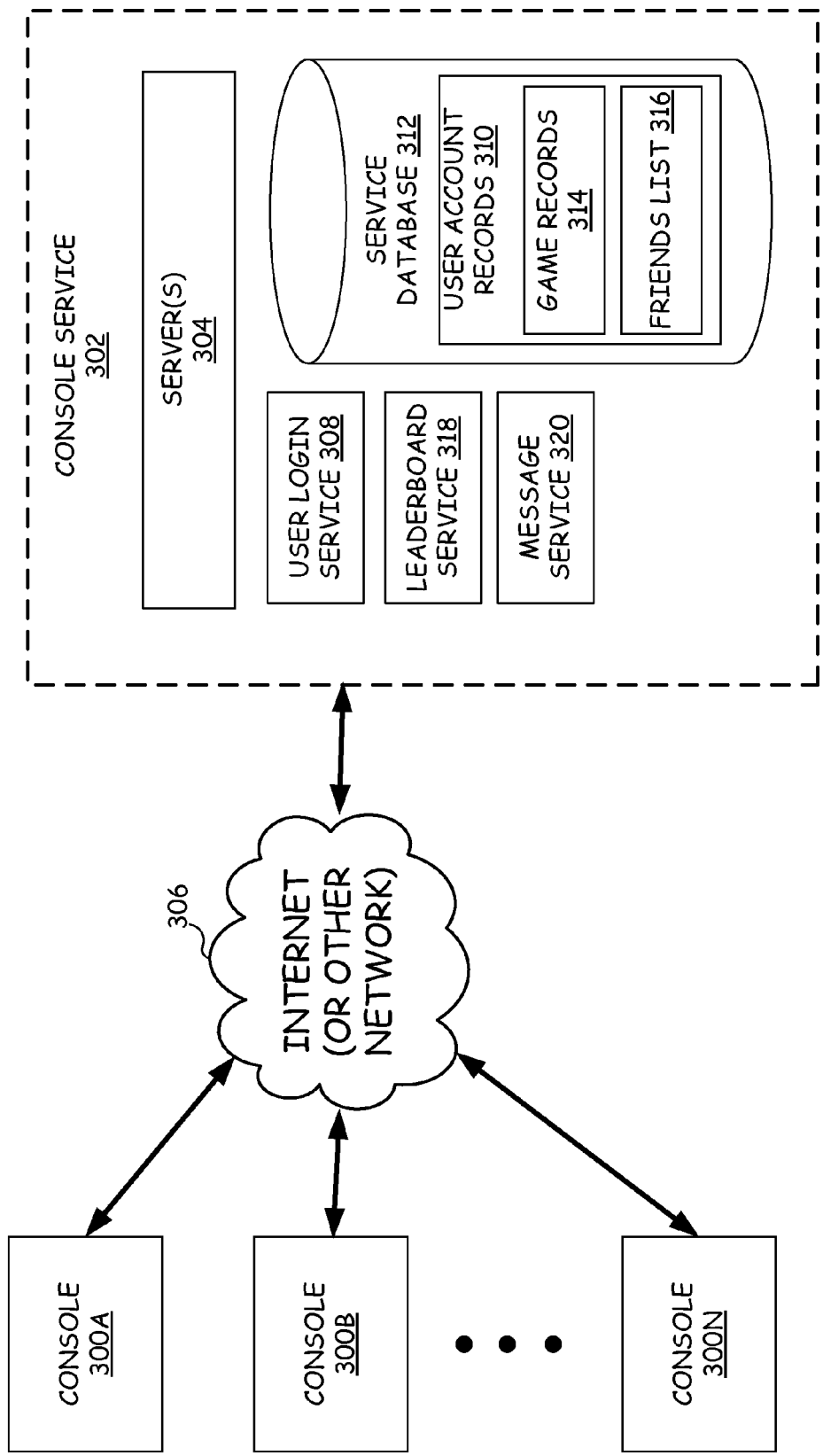
FIG. 3 is a block diagram of an exemplary operating environment for rendering achievement information.

FIG. 3 provides a block diagram of multiple consoles 300A-300N networked with a console service 302 having one or more servers 304 through a network 306. In one embodiment, network 306 comprises the Internet, though other networks such as LAN or WAN are contemplated. Server(s) 304 include a communication component capable of receiving information from and transmitting information to consoles 300A-N and provide a collection of services that applications running on consoles 300A-N may invoke and utilize.

For example, consoles 300A-N may invoke user login service 308, which is used to authenticate a user on consoles 300A-N. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a database 312, which may be located on the same server as user login service 308 or may be distributed on a different server or a collection of different servers. Once authenticated, user login service 308 stores the console identifier and the network path in user records 310 so that messages and information may be sent to the console.

User records 310 can include additional information about the user such as game records 314 and friends list 316. Game records 314 include information for a user identified by a gamer tag and can include statistics for a particular game, achievements acquired for a particular game and/or other game specific information as desired.

Friends list 316 includes an indication of friends of a user that are also connected to or otherwise have user account records with console service 302. The term "friend" as used herein can broadly refer to a relationship between a user and another gamer, where the user has requested that the other gamer consent to be added to the user's friends list, and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case.

Friends list 316 can be used to create a sense of community of users of console service 302. Users can select other users to be added to their friends list 316 and view information about their friends such as game performance, current online status, friends list, etc. Friends list 316 can be used to assemble and display a "friends playing now" GUI as explained hereinafter.

User records 310 also include additional information about the user including games that have been downloaded by the user and licensing packages that have been issued for those downloaded games, including the permissions associated with each licensing package. Portions of user records 310 can be stored on an individual console, in database 312 or on both. If an individual console retains game records 314 and/or friends list 316, this information can be provided to console service 302 through network 306. Additionally, the console has the ability to display information associated with game records 314 and/or friends list 316 without having a connection to console service 302.

Server(s) 304 also include message service 320 which permits one console, such as console 300A, to send a message to another console, such as console 300B. Such messages can include text messages, voice messages, and specialized in text messages known as invites, in which a user playing the game on one console invites a user on another console to play in the same game while using network 306 to pass gaming data between the two consoles so that the two users are playing from the same session of the game. Friends list 316 can also be used in conjunction with message service 320.

Figure 4:
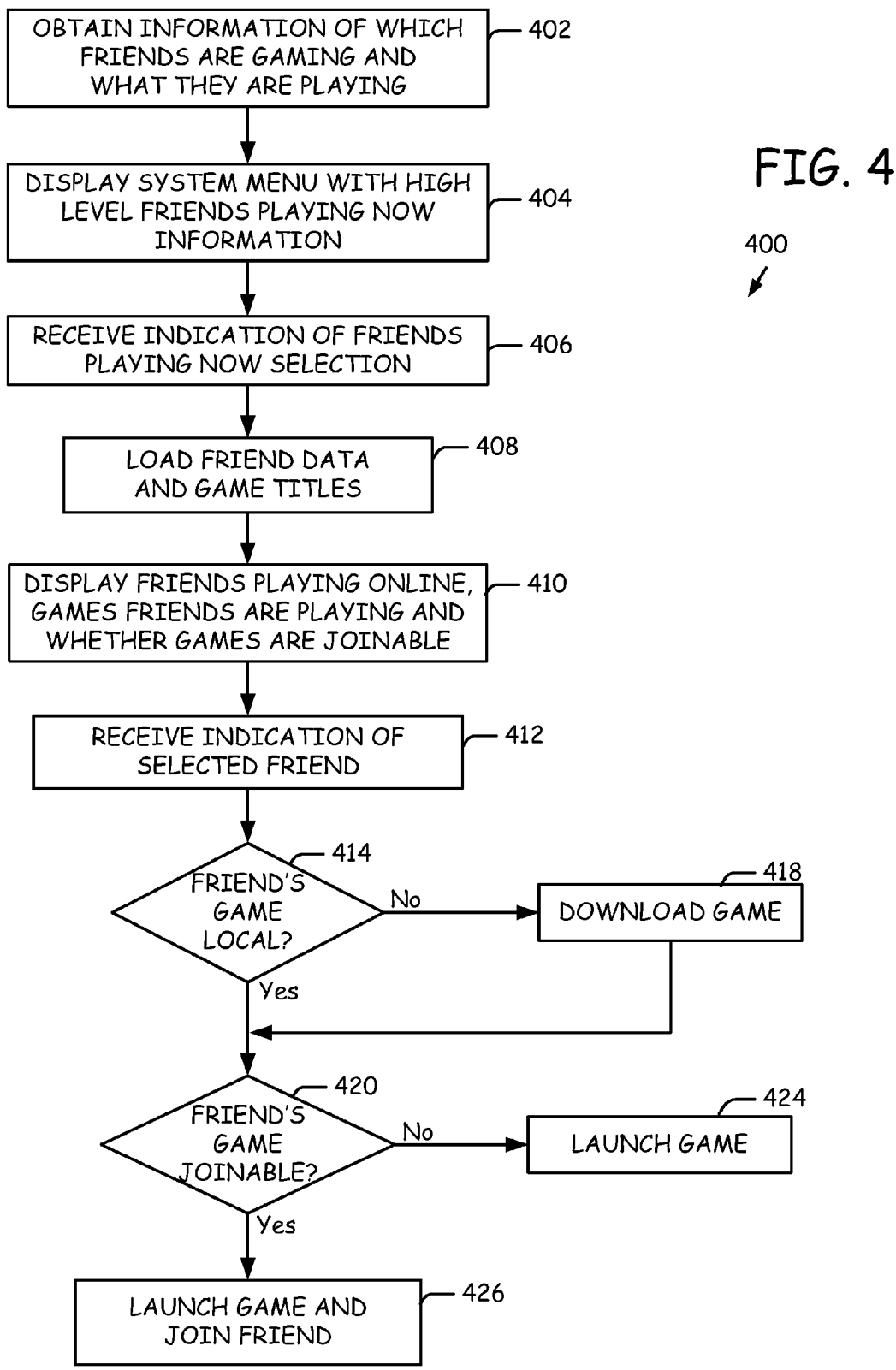
FIG. 4 is a flow diagram of a method for showing friends gaming online and the ability to download, launch and/or join their friend's game.

FIG. 4 is a flow diagram of a method 400 for displaying information relating to which user's friends are then currently gaming online, and for providing the ability to download, launch and/or join a friend's game. In step 402, the user's console may periodically query the console service 302 to determine which of the user's friends are then gaming online through service 302, and what they are playing, and return that information to the user's console. This may all be done invisibly to the user in the background. Instead of periodically obtaining this information as shown in step 402, this information may be obtained only upon the user selecting the Friends Playing Now option as explained below.

Figure 5:
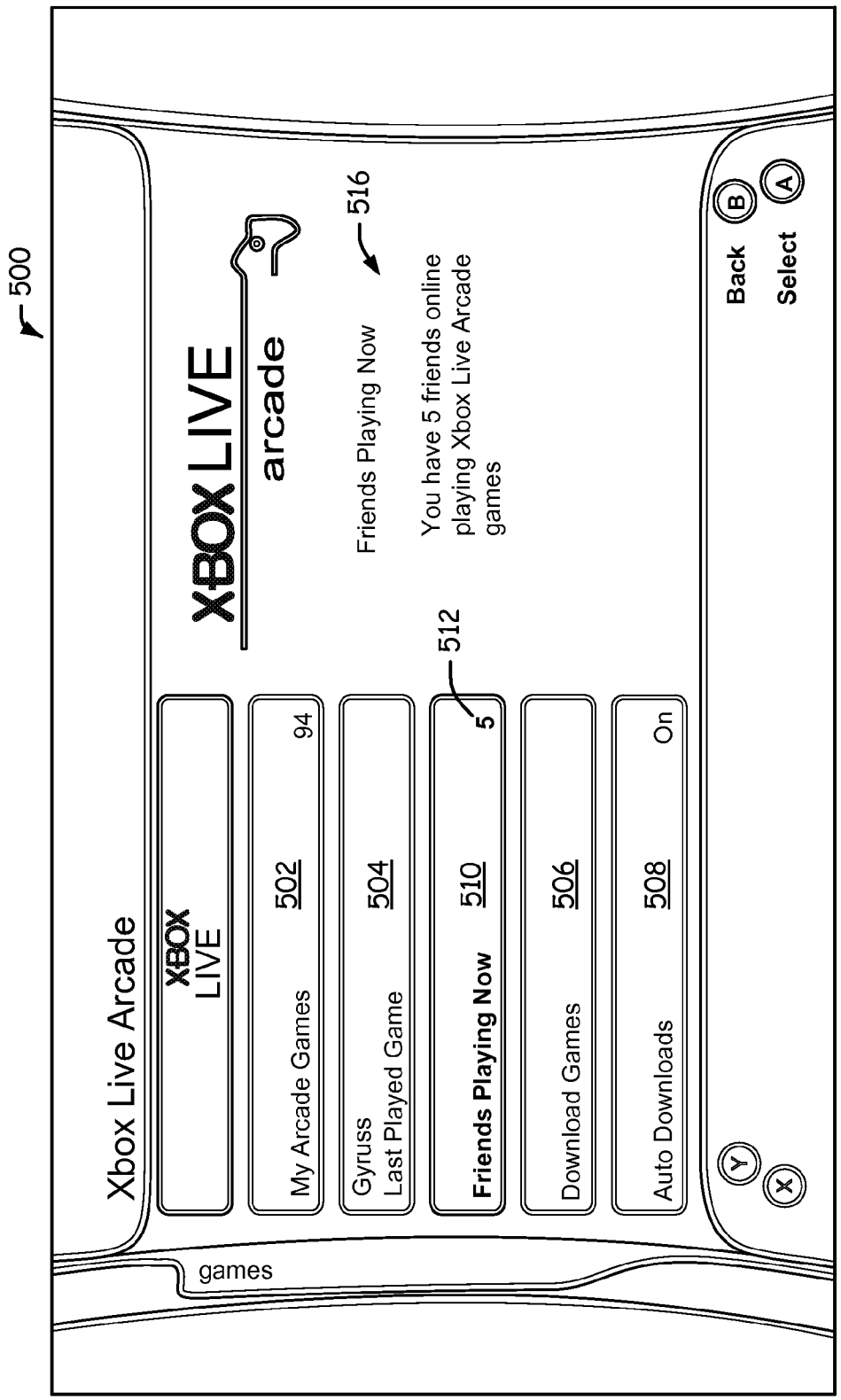
FIG. 5 is an exemplary user interface providing a menu including an option to find out which friends are then currently gaming online.

Referring now to step 404 and FIG. 5, a GUI 500 may display a system menu including high level gaming information on the user's display 150. The high level gaming information may include menu item 502 showing the games currently stored locally on the user's system, menu item 504 showing the last played game, menu item 506 providing a link to download games from service 302 or elsewhere and menu item 508 which, when enabled, automatically downloads newly released trial versions of games to the user's system. It is understood that these menu items are not critical to the present system, and that one or more of these menu items may be omitted and/or others added.

System level GUI 500 further includes a menu item 510 for displaying high level information regarding which friends of the user are then currently playing online games through console service 302, referred to herein as "Friends Playing Now." The menu item 510 may further include a number, shown at reference 512, indicating the number of friends of the user that are then currently playing online games. As indicated above, this information may be obtained by the user's console 300 periodically querying the console service 302.

A user may place focus on menu item 510, by positioning the graphical screen cursor over menu item 510. This may result in a graphic 516 such as that shown to the right of menu item 510, "Friends Playing Now—You have 5 friends online playing Xbox Live Arcade games." Other graphics are possible, and the graphic 516 may be omitted in alternative embodiments.

Figure 6:
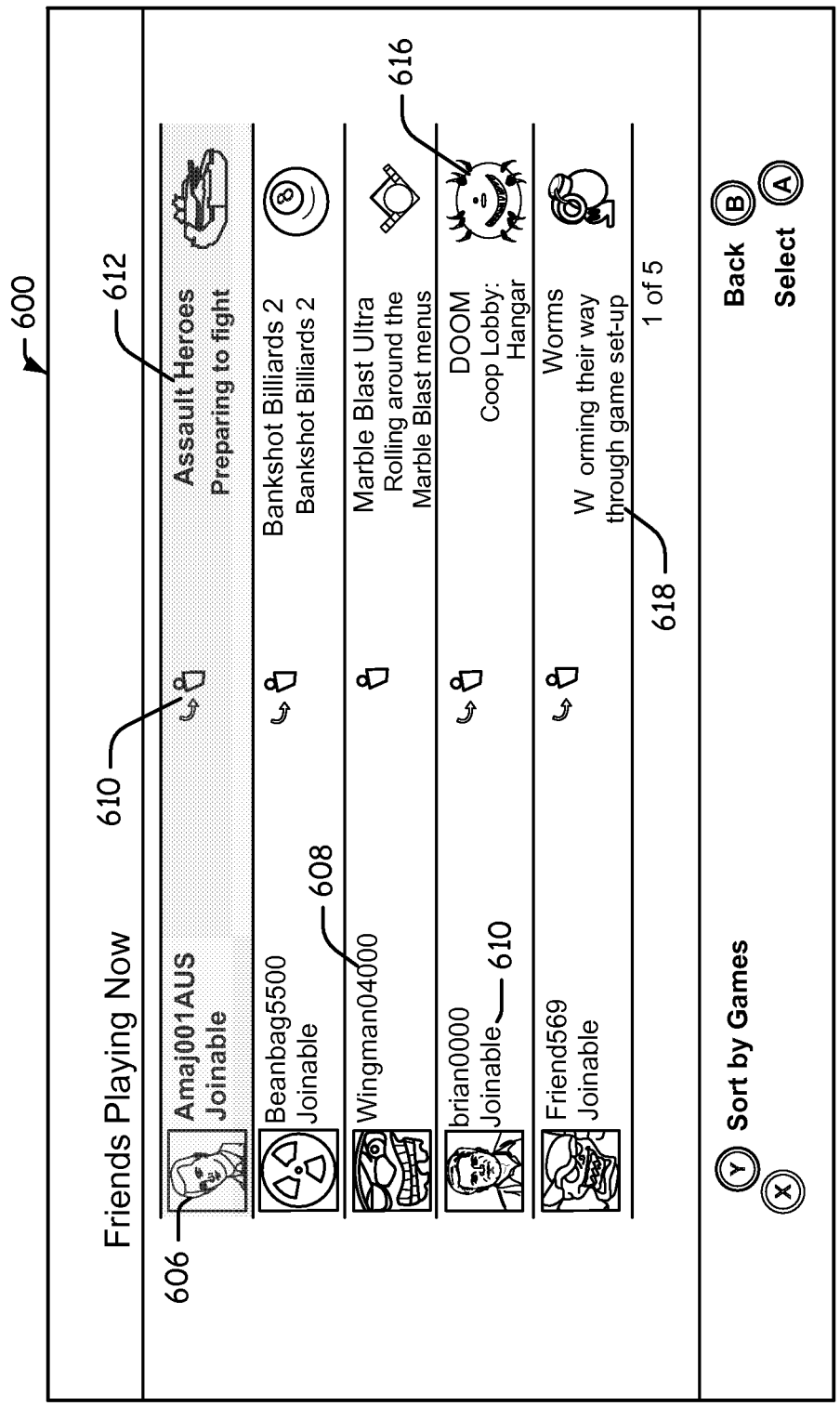
FIG. 6 is an exemplary user interface providing information about which friends are then currently gaming online, which games they are playing and providing the ability to download, join and/or launch a game.

If the system receives an indication in step 406 that the user has selected the Friends Playing Now option from system level GUI 500, the system may then generate a Friends Playing Now GUI 600 such as shown in FIG. 6. In particular, upon receiving an indication that the user has selected the Friends Playing Now option, for example by selecting the menu item 510, the system may load friend and game data into a memory buffer in step 408. This information may include which friends are then currently gaming online through service 302, their avatar (an icon or graphic the friend has selected as their online identity), what they are then playing, and information about the game, such as whether it is joinable and where the friend currently is within that game. As indicated above, this information may be periodically pulled from service 302 by the user's console 300 and stored locally within the user's system, or it may be obtained when the user selects the Friends Playing Now menu item 510.

This information may be displayed on Friends Playing Now GUI 600 in step 410. As shown in FIG. 6, GUI 600 may include a plurality of rows, each including a friend's avatar 606 and name 608 for each friend then gaming online. GUI 600 may further include a written and/or graphical indication 610 of whether the game the friend is playing is joinable. For example, in the friends listing shown in GUI 600, all games are joinable except for the game then being played by "Wingman04000." Each row may further include the name 612 of the game the friend is then playing, a graphic 616 associated with the game, and a status 618 of what the friend is then doing in the game.

A user may review the list shown in GUI 600 and select a friend's game to play by double selecting one of the rows. For example, in FIG. 6, the user has selected "Assault Heroes," being played by "Amaj001AUS." The system receives this selection in step 412. In step 414, the system determines whether the selected game is local on the user's system. If not, the system may download this game in step 418 from service 302. The system may display a confirmation message requiring user confirmation before downloading the selected game.

In step 420, the system then determines whether the selected game is joinable. If the system determines a selected game is not joinable, the system launches the game in step 424. If the system determines a selected game is joinable, the system launches the game in step 426 and joins the friend. Some games may require an invitation to join a friend. In this instance, upon selection of a friend's game to join in step 412, an invitation may be sent to the friend requiring a response from the friend before the user can join the friend's game. If no acceptance is received, then the game may be launched but not joined by the user.

In parallel with steps 410 through 426, the user may send a text or other message to the friend via the message service 320 to let the friend know that the user has seen them online and/or to let the friend know the user would like to join the friend in his/her game.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. In a gaming and media system having a user interface including a display and a user interface selection device, a method of allowing a user to find friends gaming and of allowing the user to download, launch and/or join a friend's game, the method comprising the steps of:
    (a) receiving an indication via a graphical user interface to view a list of friends of the user then currently gaming;
    (b) loading into local memory information relating to the user's friends then currently gaming and the games the friends are then currently playing;
    (c) displaying on a single graphical user interface on the display, without user interaction, a list of the user's friends then currently gaming, a list of the games the user's friends are playing and a separate graphical indicator for each of the user's friends in the list, indicating for each friend whether the game the user's friend is playing is joinable;
    (d) receiving a selection of a game a friend is playing;
    (e) determining whether the game selected in said step (d) is local to the user's system;
    (f) downloading the game to the user's system if it is determined in said step (e) that the selected game is not local to the user's system;
    (g) determining whether the game selected in said step (d) is joinable;
    (h) launching the selected game; and (i) joining, through interaction with the same graphical user interface displayed in said step (c), the selected game if it is determined in said step (g) that the selected game is joinable.

2. A method as recited in claim 1, wherein said step (a) of receiving an indication via a graphical user interface to view a list of friends of the user then currently gaming comprises the step of the user selecting a menu item from a menu list via the selection device.

3. A method as recited in claim 1, wherein said step (b) of loading into local memory information relating to the user's friends then currently gaming and the games the friends are then currently playing comprises the step of periodically loading into local memory from a networked service, prior to said step (a), information relating to the user's friends then currently gaming and the games the friends are then currently playing.

4. A method as recited in claim 1, wherein said step (b) of loading into local memory information relating to the user's friends then currently gaming and the games the friends are then currently playing comprises the step of loading into local memory from a networked service, after said step (a), information relating to the user's friends then currently gaming and the games the friends are then currently playing.

5. A method as recited in claim 1, wherein said step (d) of receiving a selection of a game comprises the step of receiving an indication of a friend playing a particular game.

6. A method as recited in claim 1, said step (c) of displaying a list of the user's friends then currently gaming comprises the step of displaying on the single graphical user interface on the display at least one of an avatar and a friend's online name for each of the user's friends listed.

7. A method as recited in claim 1, further comprising the step (j) of prompting the user for a confirmation prior to downloading in said step (f) if it is determined in said step (e) that the selected game is not local to the user's system.

8. A method as recited in claim 1, further comprising the step (k) of sending a request to the friend selected in said step (d) to join the friend's game prior to said step (i) of joining the selected game if it is determined in said step (g) that the selected game is joinable.

9. A method as recited in claim 8, further comprising the step (m) of waiting for a response to the request prior to joining the friend's game in said step (i).

10. A method as recited in claim 1, further comprising the step (n) of sending a message to the selected friend informing him/her of the user launching the friend's game and/or the user joining the friend's game.

11. In a gaming and media system having a user interface including a display and a user interface selection device, a method of allowing a user to find friends gaming online via a network service comprising one or more servers, and of allowing the user to download a friend's game from the one or more servers of the network service, launch a friend's game and/or join a friend's game, the method comprising the steps of:
  (a) loading from a server of the one or more servers of the network service into local memory of the gaming and media system information relating to the user's friends then currently gaming and the games the friends are then currently playing;
  (b) displaying on a single graphical user interface, at the same time, without user interaction, a list of the user's friends then currently gaming, a list of the games the user's friends are playing and whether or not the games the user's friends are playing are joinable;
  (c) receiving an indication of a selected friend and game the friend is playing;
  (d) determining whether the game indicated in said step (c) is local to the user's system;
  (e) downloading the game to the user's system if it is determined in said step (d) that the indicated game is not local to the user's system;
  (f) determining whether the game indicated in said step (c) is joinable;
  (g) launching the indicated game; and
  (h) joining the indicated game if it is determined in said step (f) that the indicated game is joinable.

12. A method as recited in claim 11, wherein said step (a) of loading from the network service into local memory information relating to the user's friends then currently gaming and the games the friends are then currently playing comprises the step of periodically loading into local memory from the network service information relating to the user's friends then currently gaming and the games the friends are then currently playing.

13. A method as recited in claim 11, wherein said step (b) of displaying a list of the user's friends then currently gaming comprises the step of displaying on the single graphical user interface at least one of an avatar and a friend's online name for each of the user's friends listed.

14. A method as recited in claim 11, wherein said step (h) of joining the indicated game is accomplished from the same graphical user interface displayed in said step (b).

15. A method as recited in claim 11, further comprising the step (k) of sending a request to the friend indicated in said step (c) to join the friend's game prior to said step (h) of joining the indicated game if it is determined in said step (f) that the indicated game is joinable.

16. A method as recited in claim 11, further comprising the step (m) of sending a message to the indicated friend informing him/her of the user launching the friend's game and/or the user joining the friend's game.

17. In a gaming and media system having a user interface including a display and a user interface selection device, a method of allowing a user to find friends gaming online and of allowing the user to download, launch and/or join a friend's game, the method comprising the steps of:
  (a) loading from the network service into local memory information relating to the user's friends then currently gaming and the games the friends are then currently playing;
  (b) displaying at the same time on a graphical user interface a list of the user's friends then currently gaming, a list of the games the user's friends are playing and whether the games the user's friends are playing are joinable;
  (c) receiving an indication of a selected friend;
  (d) determining whether the game played by the friend indicated in said step (c) is local to the user's system;
  (e) downloading the game to the user's system if it is determined in said step (d) that the indicated game is not local to the user's system;
  (f) determining whether the game indicated in said step (c) is joinable;
  (g) launching the indicated game; and
  (h) joining the indicated game if it is determined in said step (f) that the indicated game is joinable.

18. A method as recited in claim 17, wherein said step (a) of loading from the network service into local memory information relating to the user's friends then currently gaming and the games the friends are then currently playing comprises the step of periodically loading into local memory from the network service information relating to the user's friends then currently gaming and the games the friends are then currently playing.

19. A method as recited in claim 17, wherein said step (h) of joining the indicated game is accomplished from the same graphical user interface displayed in said step (b).

20. A method as recited in claim 17, further comprising the step (k) of sending a request to the friend indicated in said step (c) to join the friend's game prior to said step (h) of joining the indicated game if it is determined in said step (f) that the indicated game is joinable.

* * * * *